US010894204B2

(12) United States Patent
Buchanan et al.

(10) Patent No.: US 10,894,204 B2
(45) Date of Patent: Jan. 19, 2021

(54) EXO-TENDON MOTION CAPTURE GLOVE DEVICE WITH HAPTIC GRIP RESPONSE

(71) Applicant: Contact Control Interfaces, LLC, West Chester Township, OH (US)

(72) Inventors: Thomas F Buchanan, West Chester, OH (US); Timothy Meyer, Latham, NY (US)

(73) Assignee: CONTACT CONTROL INTERFACES, LLC, West Chester Township, OH (US)

( * ) Notice: Subject to any disclaimer, the term of this patent is extended or adjusted under 35 U.S.C. 154(b) by 0 days.

(21) Appl. No.: 15/884,965

(22) Filed: Jan. 31, 2018

(65) Prior Publication Data
US 2018/0311570 A1 Nov. 1, 2018
US 2020/0282302 A9 Sep. 10, 2020

Related U.S. Application Data

(63) Continuation-in-part of application No. 15/497,617, filed on Apr. 26, 2017, now Pat. No. 10,137,362.
(Continued)

(51) Int. Cl.
*A63F 13/212* (2014.01)
*G06F 3/01* (2006.01)
(Continued)

(52) U.S. Cl.
CPC ........ *A63F 13/212* (2014.09); *A41D 19/0027* (2013.01); *A63F 13/24* (2014.09);
(Continued)

(58) Field of Classification Search
None
See application file for complete search history.

(56) References Cited

U.S. PATENT DOCUMENTS

5,945,978 A * 8/1999 Holmes ................... G06F 3/014
345/156
9,607,506 B1 * 3/2017 Manning ................ G08C 17/02
(Continued)

*Primary Examiner* — Damon J Pierce
(74) *Attorney, Agent, or Firm* — Dinsmore & Shohl LLP (57) ABSTRACT

Motion capture and haptic glove systems/methods and devices are provided in this invention. In one embodiment of the invention a motion capture and haptic glove system is described, comprising: A glove portion to be worn on top of a user's hand, the glove having finger portions for the fingers and thumb of the user; a plurality of anchoring finger caps circumscribed around the extremities of the finger portions; a plurality of anchor points configured to generate sensor data identifying a flexion/extension and an abduction/adduction of the finger portions; a plurality of tendon-like cables configured to transmit the flexion/extension and the abduction/adduction data to a plurality of measuring devices for processing, the tendon like cables being formatted to be flexible in their degree of movement; a plurality of motors to ensure constant tension in the tendon-like cable elements, wherein the plurality of motors also allow a pull back of the fingers and thumb based upon a virtual stimuli; and a housing structure residing on the forearm and connected to the glove portion via the plurality of tendon-like cables, wherein the housing unit comprises at least one motor unit and at least one routing system.

27 Claims, 7 Drawing Sheets

Related U.S. Application Data

(60) Provisional application No. 62/331,580, filed on May 4, 16.

(51) Int. Cl.
| | |
|---|---|
| *A41D 19/00* | (2006.01) |
| *A63F 13/42* | (2014.01) |
| *A63F 13/24* | (2014.01) |
| *A63F 13/285* | (2014.01) |
| *G06F 3/0346* | (2013.01) |
| *A63F 13/428* | (2014.01) |

(52) U.S. Cl.
CPC ............ *A63F 13/285* (2014.09); *A63F 13/42* (2014.09); *G06F 3/011* (2013.01); *G06F 3/014* (2013.01); *G06F 3/016* (2013.01); *G06F 3/0346* (2013.01); *A63F 13/428* (2014.09); *A63F 2300/8082* (2013.01)

(56) References Cited

U.S. PATENT DOCUMENTS

| | | | |
|---|---|---|---|
| 2011/0071664 A1* | 3/2011 | Linn | B25J 9/0006 700/213 |
| 2012/0157263 A1* | 6/2012 | Sivak | G06F 3/011 482/4 |
| 2016/0274662 A1* | 9/2016 | Rimon | G06F 3/016 |
| 2017/0165567 A1* | 6/2017 | Walters | A63F 13/285 |
| 2017/0168577 A1* | 6/2017 | Keller | G06F 3/016 |
| 2018/0289585 A1* | 10/2018 | Murison | A61H 21/00 |
| 2019/0101983 A1* | 4/2019 | Cohen | A61F 5/0102 |

* cited by examiner

EXO-TENDON MOTION CAPTURE GLOVE DEVICE WITH HAPTIC GRIP RESPONSE

CROSS REFERENCE TO RELATED APPLICATION

This application is a continuation-in-part of application Ser. No. 15,497,617 filed on Apr. 26, 2017.

BACKGROUND

Field of the Invention

The present invention relates to the field of motion capture and haptic feedback. More specifically, the present invention relates to systems and devices that relay precise and accurate finger motions and haptic sensations, as well as relay the sensations of shape and structure of an object within the hand upon the alignment of the finger caps in the palm.

Description of the Related Art

How users interact with objects in the virtual reality world is one of the most important factors in the immersive experience. A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local client that can be configured to receive input from users and render video on a display.

However, one thing that most users are looking forward to is complete immersion that will let them escape the real world and truly experience the virtual world around them. To do this, they will need more than just the head tracking, visual, and audio capabilities of the Head mounted display (HMDs), the game controllers or cloud based gaming systems. They will also need immersion of their hands, fingers, arms, legs, and feet to truly interact and move around the environment. For Virtual Reality, immersion can best be described as the perception of being physically present in a non-physical world via the recreation of real world stimuli. It is in the context of these problems that the current invention arises. Specifically, the problem that this invention is solving is the immersion of the hands and fingers. The invention has a unique motion capture system that relays precise and accurate finger motions as well as a system that relays haptic sensations and also relays the sensations of shape and structure of an object within the hand upon the alignment of the finger caps in the palm.

Furthermore, this invention is a haptic system that enables the recreation of the force of an interaction in virtual reality. Force is a vector and a vector has two main components, a magnitude and a direction. This invention combines two haptic systems to achieve both a sensation of magnitude and direction, thereby giving the user the most realistic experience in virtual reality.

STATEMENT OF THE OBJECTS

Embodiments of the present invention provide for a glove system, device and associated methods.

An object of the invention is the recreation of precise and accurate movement as well as sense of touch via haptic feedback.

A further object of the invention is to generate haptic sensations without requiring an external device to be held or grasped and easily applies haptic force gradients simply via the alignment of the finger caps in the palm.

A further object of the invention is to provide flexible conductive contacts on the fingertips, the rest of the fingers, and other surfaces of the hand.

Still another object of the invention is to provide users with a complete virtual reality immersion experience.

Another object of the invention is the combination of the two haptics systems to create the full sensation of the force vector, doing so by incorporating a sense of direction and magnitude to the virtual reality interaction.

Still another object of the invention is making the invention less bulky and more comfortable by having the heaviest portions of the invention being housed on the forearm.

Other objects and advantages of the present invention will be set forth in part in the description and in the drawings that follow and, in part, will be obvious from the description or may be learned by practice of the invention.

SUMMARY

To achieve the foregoing objects, and in accordance with the purpose of the invention as broadly described herein, the present invention provides systems and devices for accurately measuring precise hand movement as well as providing a haptic feedback. Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

It will be appreciated from the description of the glove systems and devices that they may be used in many environments and made in many embodiments. As used herein, a glove device may be utilized as a glove controller for a video game. However, it should be understood that the glove device does not necessarily have to be a controller utilized for playing games, but may be used for interfacing with virtual objects on a display screen viewable by a user, and for any other suitable purpose for which input defined from the glove device may be applied. It should be appreciated that the present invention can be implemented in numerous ways, such as a process, an apparatus, a system, a device or a method on a computer readable medium. Several inventive embodiments of the present invention are described below.

In one embodiment of the invention, a glove portion to be worn on top of a user's hand, the glove having finger portions for the fingers and thumb; a plurality of anchoring finger caps circumscribed around the extremities of the finger portions; a plurality of anchor points configured to generate sensor data identifying a flexion/extension as well as abduction/adduction of the finger portions; a plurality of tendon-like cables configured to transmit the flexion/extension as well as abduction/adduction data to a plurality of measuring devices for processing, the plurality of tendon like cables capable of angular displacement from a vertical or horizontal plane; a plurality of return force providers/ motors to ensure flexion and tension in the tendon-like cable elements; and a housing structure residing on the forearm and connected to the glove portion via the plurality of tendon-like cables are described.

In another embodiment of the invention, the glove further includes: at least one vibrating motor configured to be placed within at least one of the finger caps to create a vibrational motion as well as relay the sensations of shape and structure of an object within the hand upon the alignment of the finger caps in the palm.

In one embodiment of the invention the measuring device may be a potentiometer or a rotary encoder.

In a further embodiment of the invention the anchoring points are capable of capturing all the Degrees of Freedom of the invention.

In yet another embodiment of the invention the vibrational motors allow a user to experience haptic sensations upon interaction with objects in the virtual world.

In a further embodiment of the invention the return force provider quantifies an amount of force applied to at least one portion of the glove device.

In another embodiment motors can be used in place of the return force providers, to control the skeletal and physical movements of the user's hands.

In yet another embodiment of the invention, a computer processing unit inputs positional and displacement data transmitted from the measuring device and utilizes the data to impart equal and opposite force on the return force providers.

The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

The present invention will now be described h reference to the following drawings, in which like reference numbers denote the same element throughout.

DETAILED DESCRIPTION

Embodiments of the present invention are described more fully below with reference to the accompanying drawings, which form a part hereof, and which show exemplary embodiments for practicing the invention. However, embodiments may be implemented in many different forms and should not be construed as limited to the embodiments set forth herein; rather these embodiments are provided so that this disclosure will be thorough and complete, and will fully convey the scope of the invention to those skilled in the art. The following detailed description is, therefore, not to be taken in the limiting sense.

Figure 1:
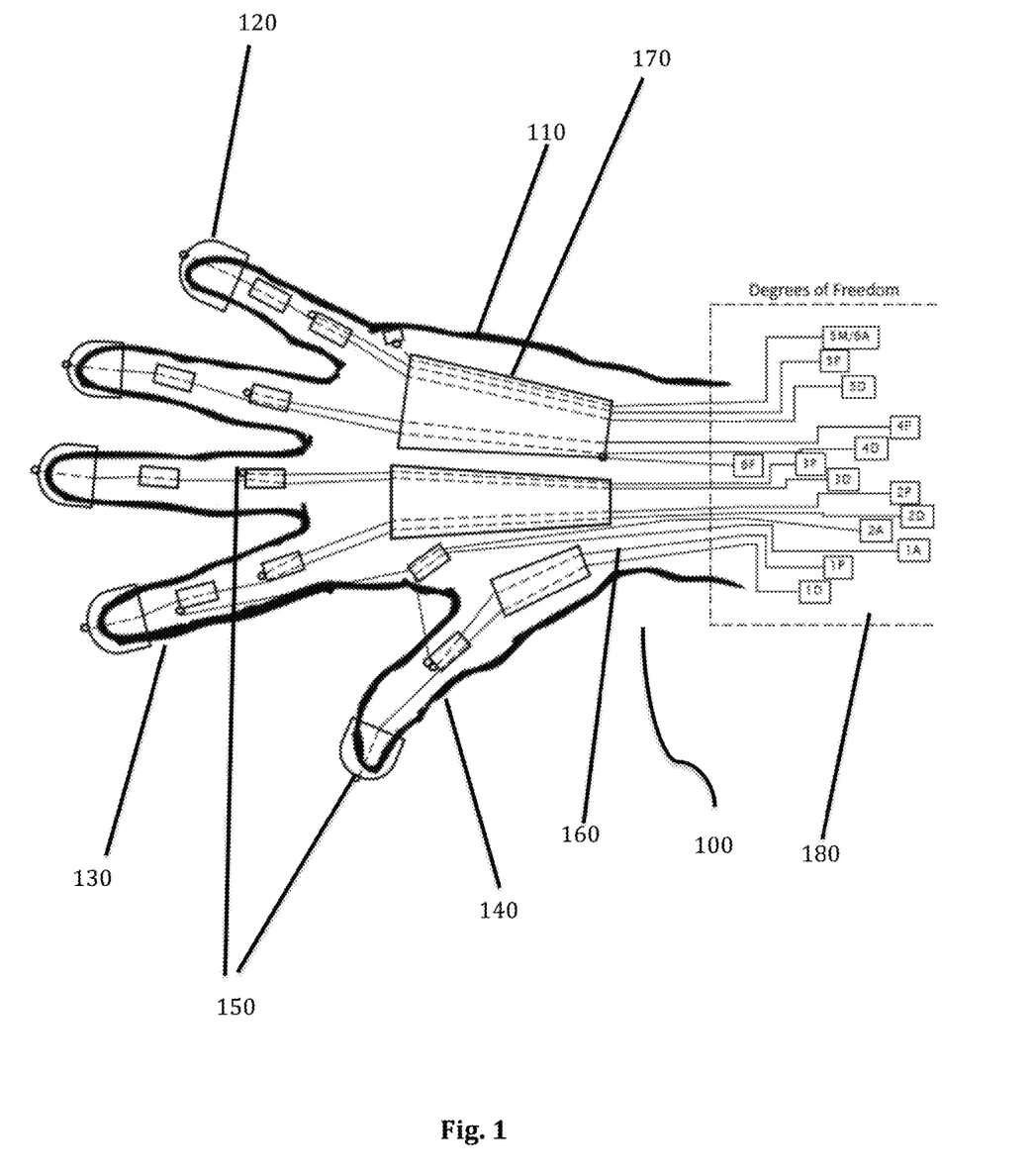
FIG. 1 is a schematic illustration of an embodiment of the motion capture motion capture and haptic glove system.
Figure 3:
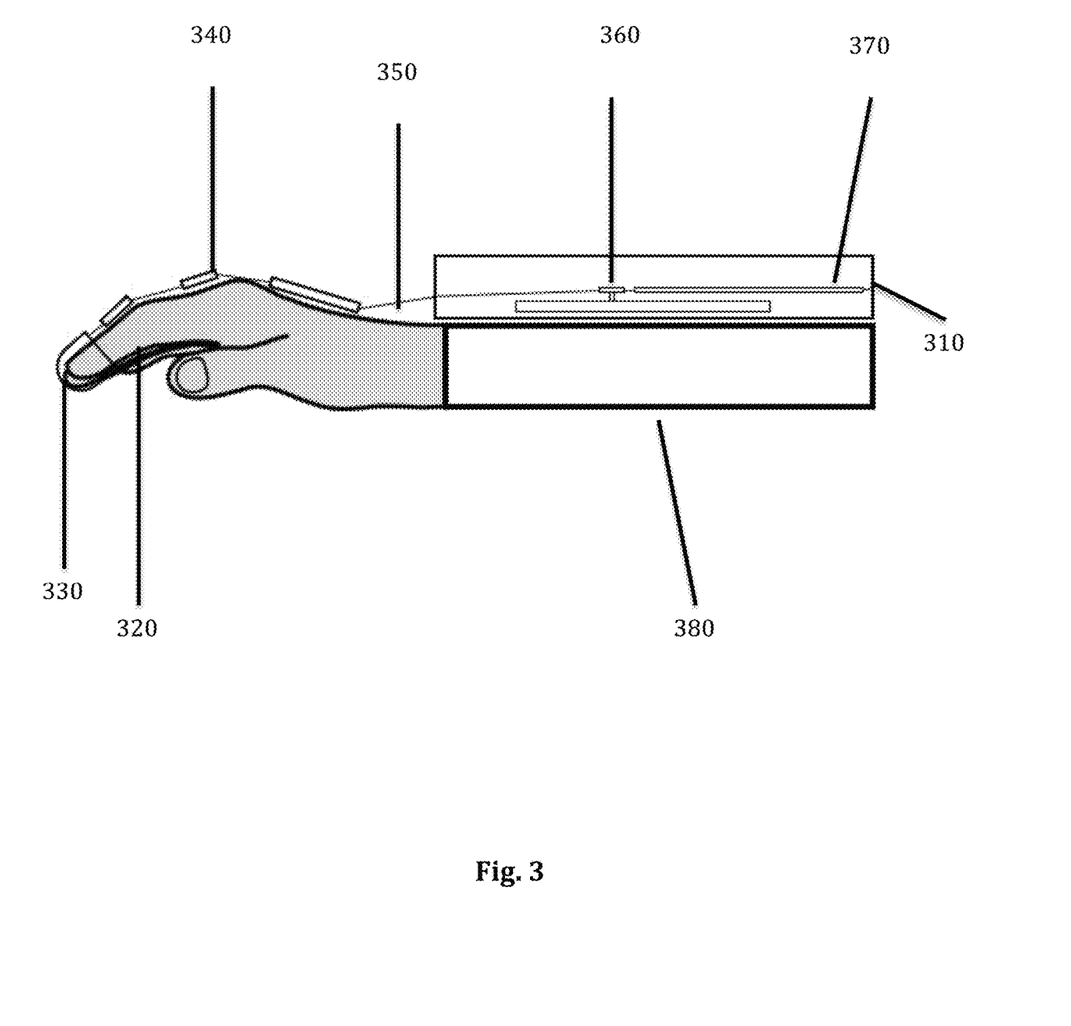
FIG. 3 is a schematic illustration of the side-view of the housing structure as attached to the glove system of FIG. 1.

Referring now to the figures, FIG. 1 depicts a top-view of an embodiment of the glove system, 100. The system consists of a glove 110, that an operator or user can wear on top of their hand. When worn by an operator, the glove, 110, allows in the recreation of accurate and precision movement as well as the sense of touch via haptic feedback. The glove system, 100, consists of anchoring finger caps, 120, circumscribing the tips of each finger, 130 and the thumb, 140. At the extremities of the anchoring finger caps, 120, reside the anchor points, 150. Further anchor points, 150, are placed at various joint positions within the hand, to allow for the most precise and accurate movement measurement. These anchor points, 150, are strategically placed in order to recreate accurate and precise hand and finger movements that highlight the movement from the critical points for each finger(s), 130, and the thumb, 140. Furthermore, these anchor points, 150, are capable of capturing all of the Degrees of Freedom (DOF) of the hand, and to generate sensor data identifying some degree of flexion/extension as well as abduction/adduction of the finger, 130, or thumb, 140, portion of the glove system. When the fingers, 130, and thumb, 140, are closed into a fist these distal anchor points, 150, align linearly within the closed grip. All the anchor points, 150, are further attached to tendon-like cables, 160. These tendon-like cables, 160, then transmit the flexion/extension as well as abduction/adduction data, or DOF to a measuring device, which may be placed on the forearm (as shown in FIG. 3). These tendon-like cables, 160, are flexible in the sense that they allow a pull and tug of the hand with ease and without the possibility of breakage. The tendon-like cables, 160, are routed to the forearm via routing fixtures, 170, which ensure that each cable is correctly routed to the associated measuring device attached to the forearm. These routing fixtures, 170, are throughout the dorsal side of the hand to route the cables properly.

Figure 2:
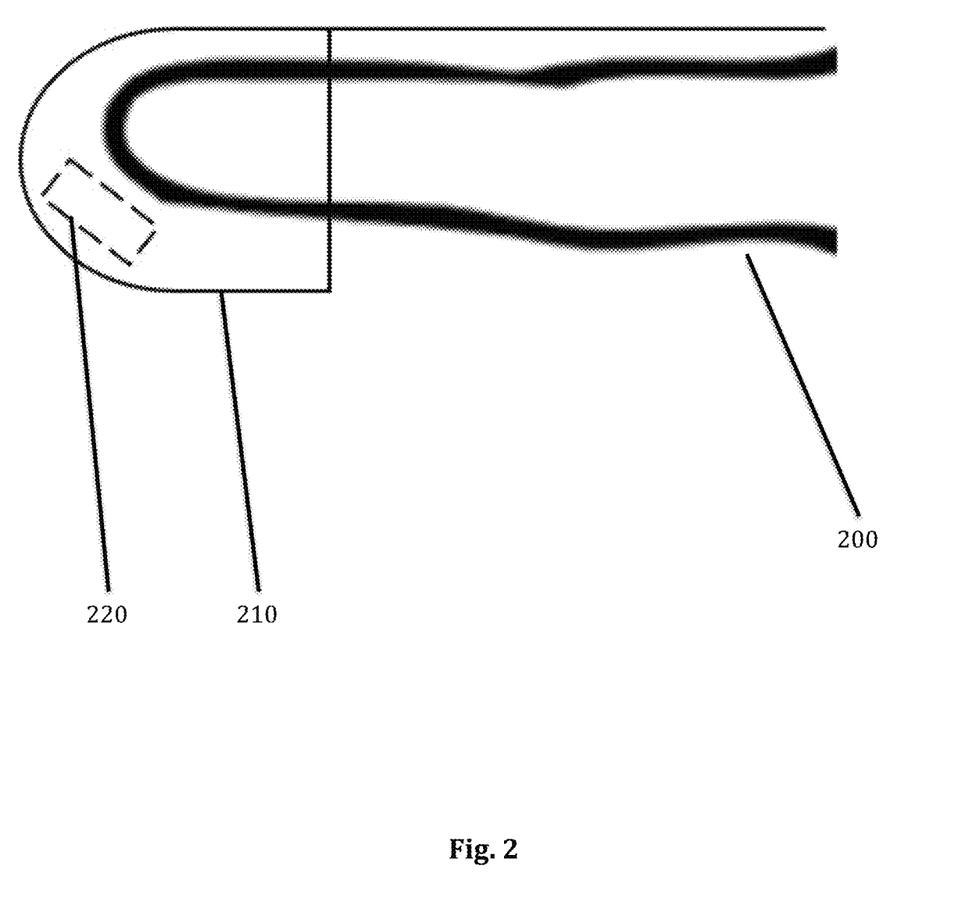
FIG. 2 is a schematic illustration of a single finger view of the input glove system of an embodiment of the invention.

The various DOFs, 180, measured by the measurement device located in a housing in the forearm may be as shown:

a. 5M/6A: 5th Metacarpophalangeal Joint, Opposition of 4th and 5th Metacarpals (5M) OR Abduction/Adduction of the Wrist (6A)

b. 5P: 5th Proximal Interphalangeal (PIP) Joint, Flexion/ Extension 5th Proximal Phalanx c. 5D: 5th Distal Phalanx Tip, Flexion/Extension 5th Distal and Middle Phalanges
d. 4P: 4th Proximal Interphalangeal (PIP) Joint, Flexion/Extension 4th Proximal Phalanx
e. 4D: 4th Distal Phalanx Tip, Flexion/Extension 4th Distal and Middle Phalanges
f. 6F: 3rd Carpometacarpal (CMC) Joint, Flexion/Extension of the Wrist
g. 3D: 3rd Distal Phalanx Tip, Flexion/Extension 3rd Distal and Middle Phalanges
h. 3P: 3rd Proximal Interphalangeal (PIP) Joint, Flexion/Extension 3rd Proximal Phalanges
i. 2P: 2nd Proximal Interphalangeal (PIP) Joint, Flexion/Extension 2nd Proximal Phalanges
j. 2D: 2nd Distal Phalanx Tip, Flexion/Extension 2nd Distal and Middle Phalanges
k. 2A: 2nd Distal Interphalangeal (DIP) Joint, Abduction/Adduction 2nd Phalange
l. 1A: 1st Interphalangeal (IP) Joint, Abduction/Adduction 1st Phalange
m. 1D: 1st Distal Phalanx Tip, Flexion/Extension 1st Distal and Proximal Phalanges
n. 1P: 1st Interphalangeal (IP) Joint, Flexion/Extension 1st Metacarpal Referring to FIG. 2, a single finger displaying an embodiment of the invention is depicted. The finger, 200, has the anchoring cap, 210, circumscribed to its distal end. The anchoring cap, 210, is capable of housing the anchor point, as displayed in FIG. 1, or a vibrating motor, 220, or actuator, or both. By embedding a vibrating motor, 220, or, actuator that performs similar function, haptic sensations are possible upon interaction with objects in the virtual world. Upon touching an object in the virtual world, these vibrators, 220, or actuators vibrate independently and at different frequencies to reproduce different touch sensations, allowing the user complete immersion in the virtual reality world.

FIG. 3 depicts a side view of the housing internals along with the associated glove system. A single finger, 320, is shown with the associated anchor cap, 330, being circumscribed around it. Attached internally to the anchor cap, 320, is the cable like tendon, 350. The tendon-like cable allows the transmission of the flexion/extension data from the anchor point (as depicted in FIG. 1) to the internals of the housing, 310. The tendon-like cable is routed to the housing, 310, via the routing fixtures, 340. The housing, 310, is attached to the forearm, 380, via a strap, buckles, or the whole arm can be inserted into a sleeve for a firm grip and minimal movement during attachment. Inside the housing, 310, is a measurement device, 360. This measurement device allows for a measurement of the change in resistance or position from the anchor point via the tendon-like cable, 350. The transmitted data is then processed to determine a finger position and pose of the glove device. An example of a measurement device may be a variable resistor or a rotary encoder that is used per measured degree of freedom (DOF) of the hand and fingers. A further example of a variable resistor may be a potentiometer to measure the movements. The variable resistors or encoders must be placed on the proximal end of its respective DOF. These variable resistors or encoders can be either linear or radial, both providing the change of resistance or position with movement of the hand and fingers. Each variable resistor/potentiometer or encoder measures the position of the fingers, or the displacement data, with a high sampling rate. Furthermore, this positional/displacement data may then be read to the analog, in the case of the variable resistor, or digital, in the case of the encoder, input of a micro controller which then may utilize an analog to digital convertor to read the data to a computer. This data can then provide an accurate and noise free motion capture of the present position of the fingers and hand relative to the forearm. The forearm is tracked in three dimensional space by a third party tracking system (not shown). This means the computer has a reliable and accurate understanding of the position of the user's fingers and hand in three dimensional space. With the understanding of the position of the hand, the computer will interpret when a collision occurs between the user's hand, and a virtual object. Once this occurs it will apply equal and opposite force to the affected muscles via the return force providers, as discussed below. This creates the illusion to the user that he is indeed touching the virtual object.

Moreover, in order to keep tension in the tendon likecable, 350, a return force provider, 370, is present at the end of the housing, 310. The return force provider, 370, may be in the form of a spring, rubber band, coil, or any material that provides the characteristics of any of those three. The return force provider, 370, allows the cables, 350, to be pulled and tugged during various hand movements. For example, the cables, 350, are selectively tensioned during a certain movement, as is when an operator is closing his hand into a desired grip pose. In another movement, the return force provider, 370, may release the tensile force to allow the cables, 350, to help release the grasp. In another embodiment, the return force provider can be supplemented by a motor (not shown) which provides additional strength to the tendon-like cables, 350, and allows to impart muscular movement to the hand artificially. These motors may also be enclosed in the housing structure, as described in FIG. 4.

Figure 4:
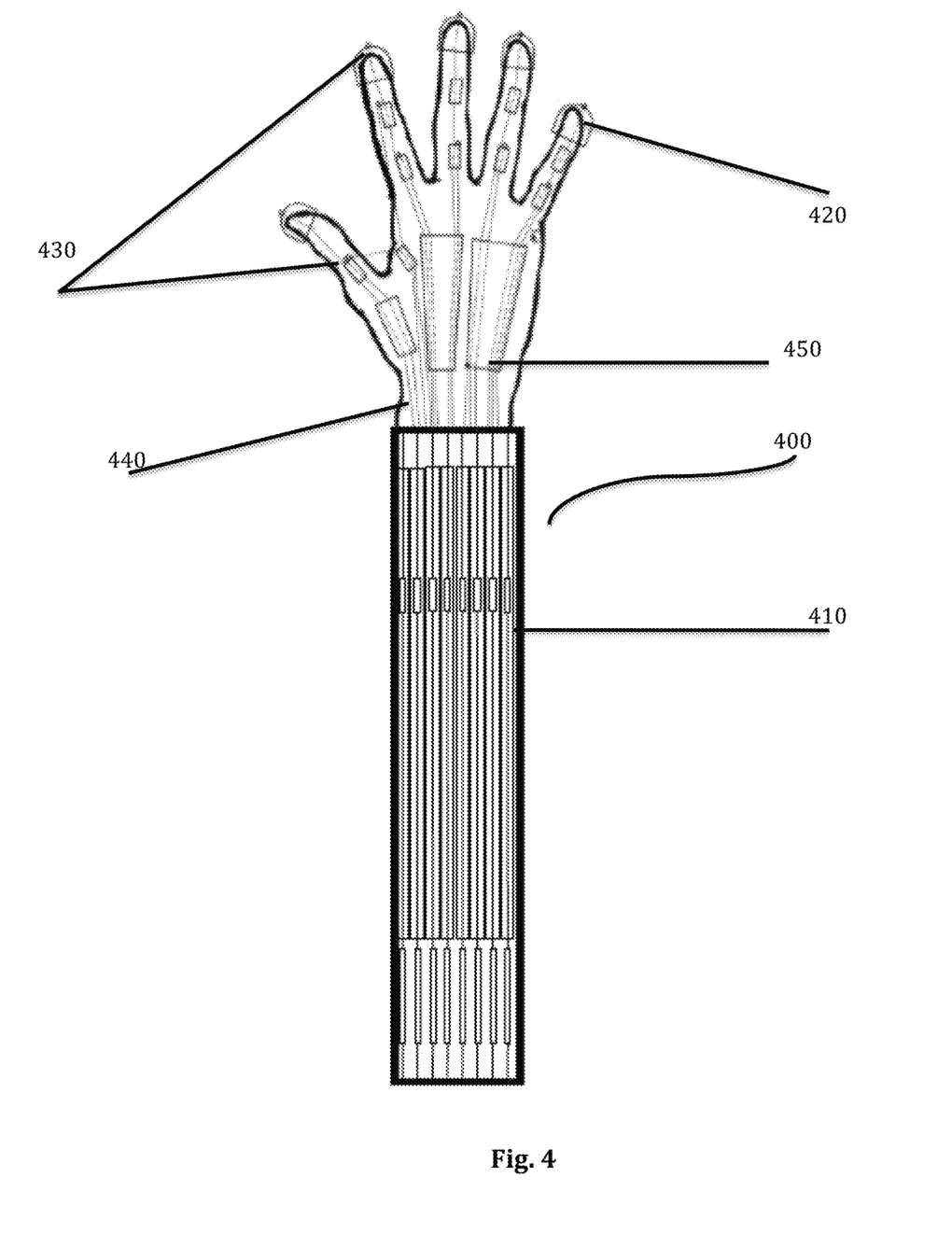
FIG. 4 is a schematic illustration of the top view of the glove system along with the attached housing structure.

FIG. 4 displays a front view of the housing structure with the attached glove device. The glove system, 400, is worn on an operator's hand, in the manner of a traditional glove, with the housing structure, 410, strapped, buckled or worn as a sleeve onto the forearm. The glove system, 400, is attached to the housing structure, 410 at the wrist of the hand, still allowing bending or rotating of the wrist as needed via a hinge. The anchoring caps, 420, are circumscribed onto the distal ends of each finger and thumb of an operator's hand, wherein the anchor points, 430, are located at the extremities of the anchoring caps, 420. Further anchor points, 430, are strategically located at various movement points of the fingers and thumb to provide for accurate movement measurement. Tendon-like cables, 440, are attached to each of the anchor points, 430, and are routed into the housing structure, 410, via routing fixtures, 450. The routing fixtures, 450, allow the associated tendon-like cables, 440, from each anchor point to be routed to its specific measurement device located within the housing structure, 410. A single measurement device or variable resistor or encoder is used to measure each DOF movement for a single anchor point and process this data to determine a finger position and pose of the glove device. The measuring device must be placed on the proximal end of the movement, as displayed in FIG. 1. Furthermore, within the housing structure is provided the return force provider, which may be in the form of, for example, a spring. This return force provider ensures that the glove can be flexed and/or tightened during the various motions and movements with ease, to optimize the user's virtual reality experience.

Figure 5:
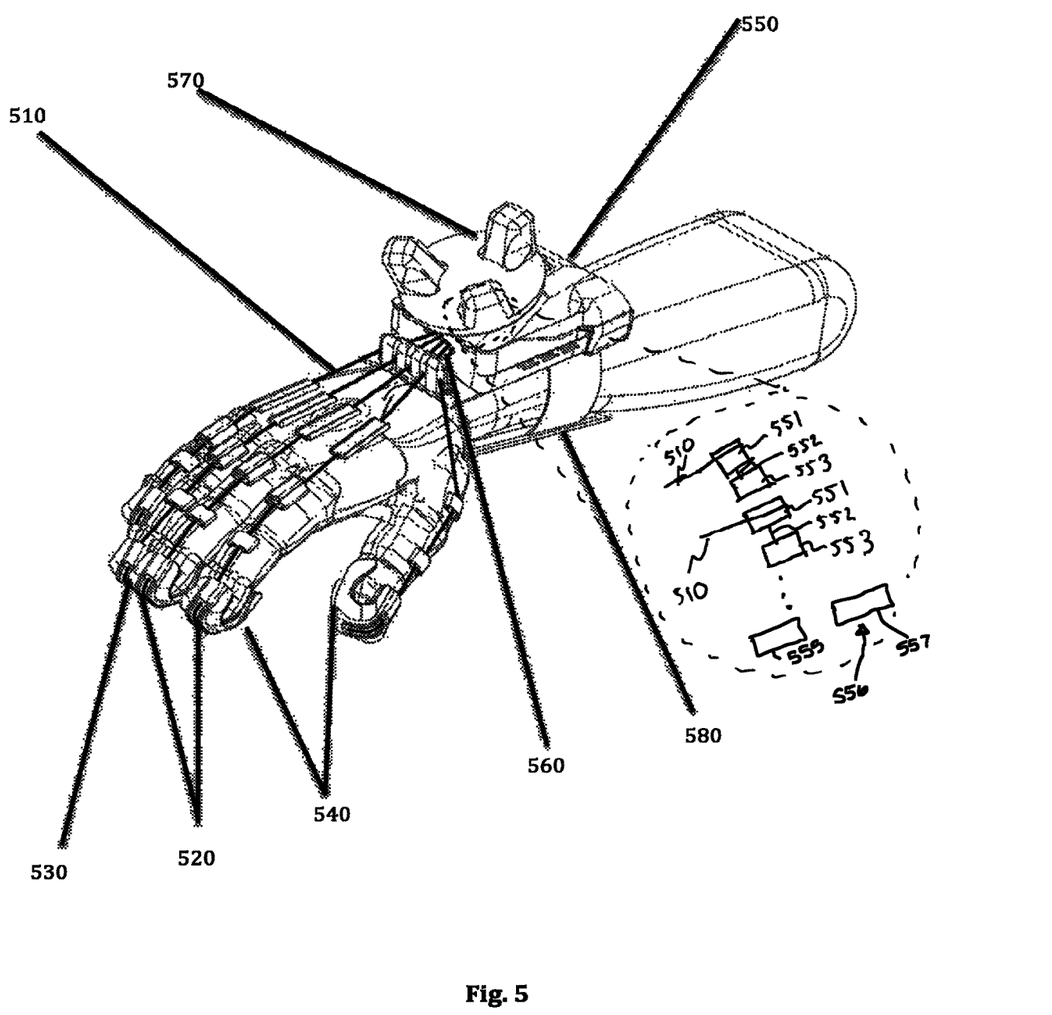
FIG. 5 is an orthographic illustration of another embodiment of the motion capture and haptic glove system.

Moving on to FIG. 5, this figure depicts an orthographic view of another embodiment of the invention. In furtherance to the embodiment stated above, the tendon like cables 510 are shown to be attached to strategic anchor points on the finger tips 520. As stated above, anchor points are not simply limited to the finger tips, 520 but can be strategically located throughout the device, The tendon like cables, 510 are secured in the same finger cap 530 at the tip of the finger 520 as the vibration motor 540. This occurs across all fingers and the thumb of the device. The tendon like cables 510, then run along the dorsal side of the fingers and hand through the exoskeleton 540, as shown. The exoskeleton 540 is designed to have as low a form factor as possible. The tendon like cables 510 run between each joint, all the way back to the housing 550 that sits on the forearm. These tendons 510 enter the housing 550 and are routed to a spool 551, this routing can be achieved via routing fixtures, or as disclosed in this embodiment of the invention via a routing system, 560. Each tendon 510 routes to its own spool 551. Each spool 551 is fixed to a shaft 552 attached to a DC motor 553, wherein the DC motor 553 is wired through a control circuit that connects it to the system's microcontroller. These motors 553 are disclosed as another embodiment of the invention in place of the return force providers disclosed previously. Furthermore, these motors 553 are contained in the housing as a motor unit (further disclosed below).

Each motor 553 also has an attached heat sink 555 contained within the housing. The surrounding housing 550 must also have a minimum of one cooling device 556, such as a cooling fan 557 within it to blow air across the heat sinks 555 and cool the motors 553 in case of overheating. The overall system is tracked in 3D virtual space through a tracking system 570, sitting on top of the housing 550, wherein the tracking system could be one of many currently in common use in similar devices. This virtual tracking may be by means of external cameras situated in the room.

The tendons 510 may be made of any material that can be wound around the spool when pulled back by the motor but also freely move with the movements of the hand. While the tendons 510 may be made of a material with any amount of stretch properties, for the lowest latency, the material must have minimal elastic properties as possible.

Depending on the finger tracking system utilized, and the layout of that finger tracking system, the tendons 510 can be run either below or above, preferably as close to the finger as possible. The tendons 510 are formatted to be the closest component of the fabric as the skin, and further a layer of low friction material may be placed over the section where the knuckles of the user's fingers are. This low friction material could prevent the tendons 510 from rubbing into the skin of the user. Furthermore, a low friction cable also avoids inhibiting movements.

In an embodiment of the invention the tendon like cables 510 are flexible in their degree of movement and the angle that at least one of the tendon 510 comes off of the finger cap 530 can be altered to change the force direction. This angular displacement from either a vertical or a horizontal plane at any given time may be as little as 5-10 degrees to allow a user to experience the change in direction. This angular displacement of the tendons, 510, along with the vibration from the vibrational motor 540, upon a user coming into contact with an object in the virtual world, allows a user to experience both the vectors of force, magnitude and direction, thereby giving the user as close a sensation of touch in the virtual world as possible.

Furthermore, the tendon 510 is configured to run along the back of the fingers and hand. This works really well for surface detection of objects when a user taps his finger down so that his finger tip 520 is the point of contact with a virtual object. The expectation would be that this sensation would not feel realistic when trying to flick or tap something with the fingernail. Due to the stimuli and the expectations of the user, the present invention does a convincing job of recreating sensation and direction to both sides of the finger.

The housing 550 for this embodiment is secured to the user's arm via elastic straps and buckles 580. Other embodiments of the invention can utilize Velcros, a zipper, or any other attachment mechanism as long as it secures the housing 550 sufficiently enough so that when the motors 553 activate, the housing 550 isn't pulled towards the fingers. Further, cooling fans 557 are located within the housing 550. The ideal location of the cooling fans 557 is at a position that the flow of air is evenly distributed across all of the motors 553 and heat sinks 555. This is why more than one cooling fan 557 can be more effective. Depending on the motor layout in the housing 550 on the forearm, more than one fan may be needed to best cool all motors 553.

Location of the components of the 3D positional tracking system 570, relative to this invention and all other aspects of the device is dependent on the requirements of each respective 3D positional tracking system.

Figure 6:
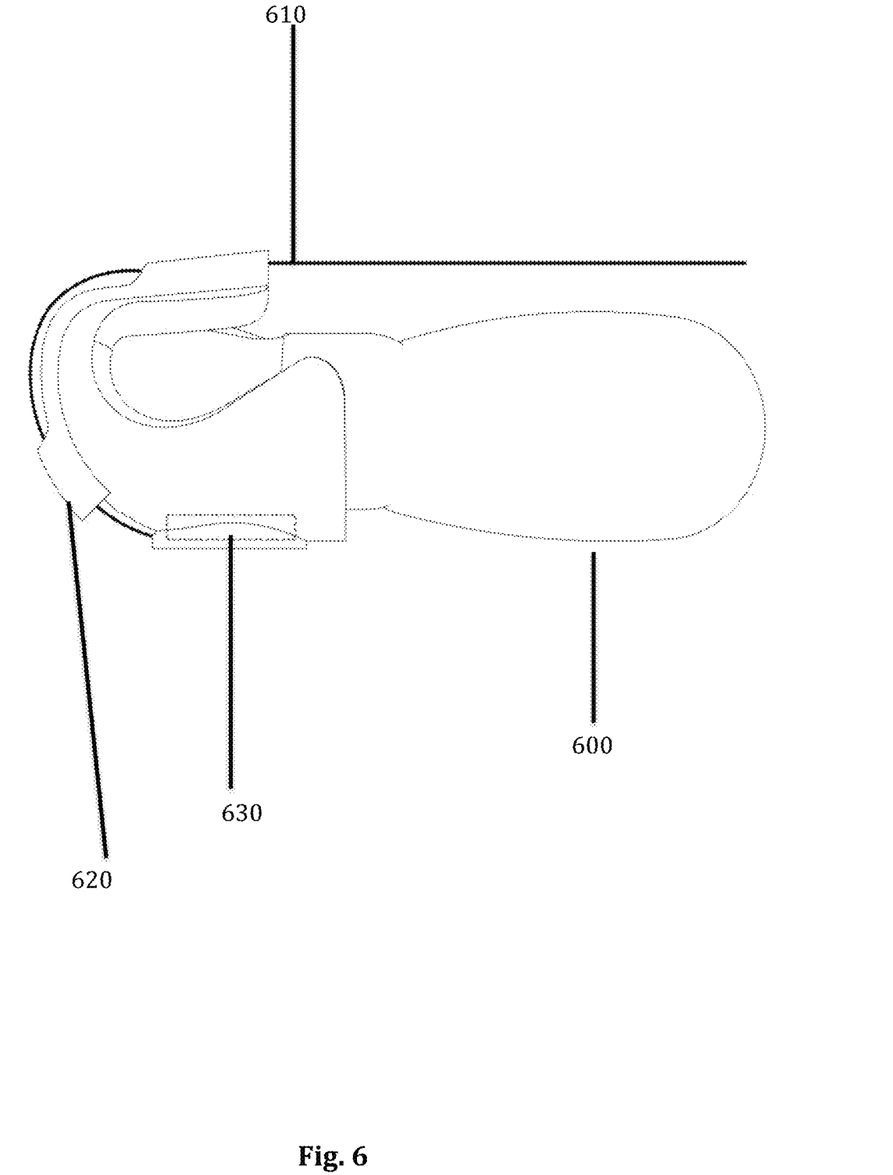
FIG. 6 is a schematic illustration of another embodiment of the single finger view of the glove system.

In another embodiment of the invention as depicted in FIG. 6, the single finger 600 is depicted with the tendon 610, wherein each tendon 610 is secured in the finger cap 620 at the tip of the finger 600, as the vibration motor 630. This occurs across all fingers and the thumb. Further, the tendon 610 runs along the dorsal side of the fingers, as shown.

Each time a real finger touches another real object there is a force on both objects, the force of the finger to the object and an equal and opposite force back on the finger from the object. Each force is a vector, having a magnitude and a direction. The magnitude element of force can be recreated by means of the vibrational motors, 630, as also described in embodiments stated above. The directional element can be achieved by altering the angle that the tendon 610 comes off of the finger cap 620. This angular displacement from a vertical or horizontal plane at a given time may be as little as 5-10 degrees, preferably between 5-7 degrees. This allows a precise recreation of force of interaction in virtual reality and gives the user an even more immersive experience.

Figure 7:
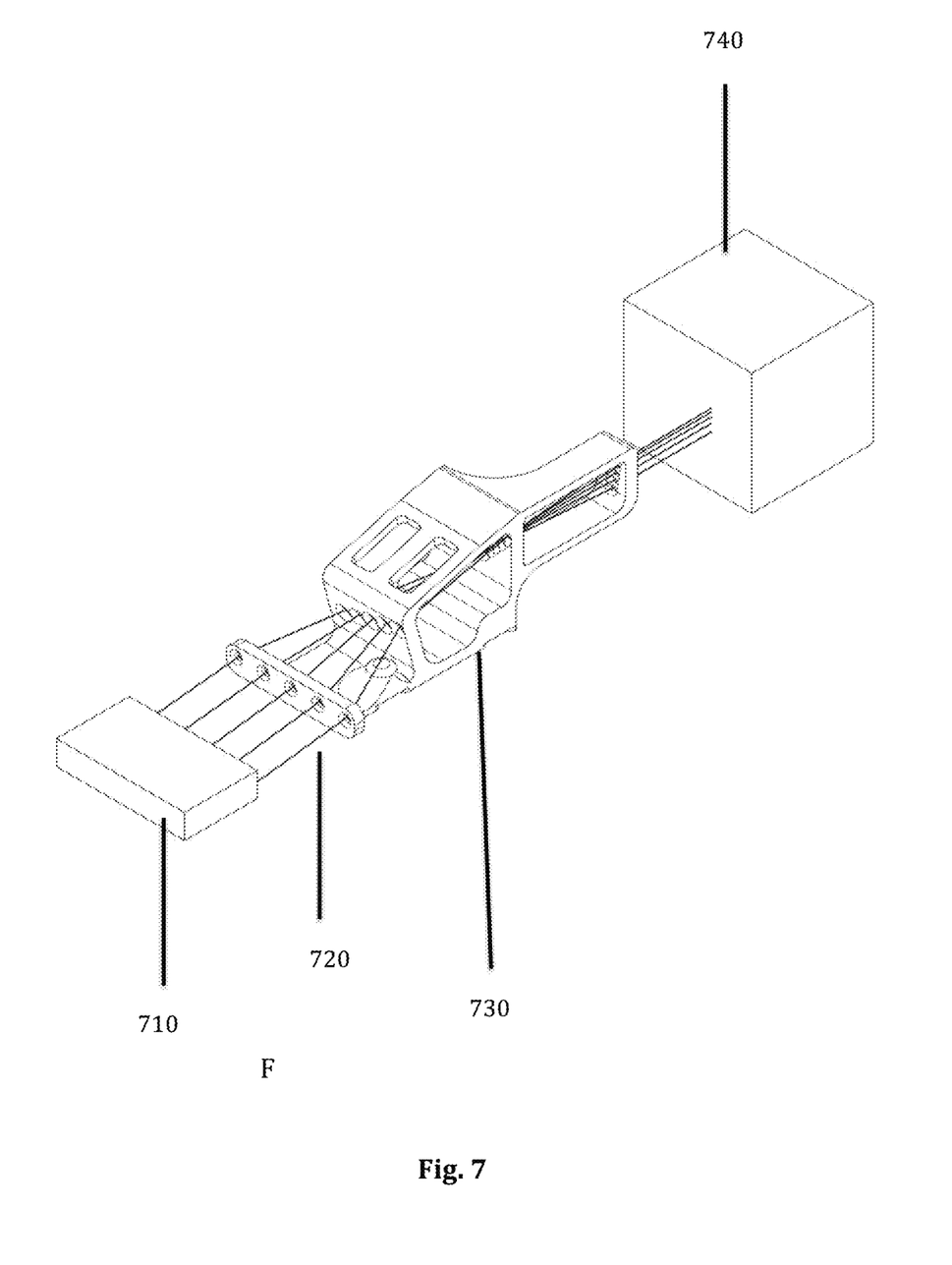
FIG. 7 is a top cross-sectional view of the internals of the housing system of the glove device.

FIG. 7 depicts a top cross-sectional view of the haptic system. The glove device, 710 is shown to be connected to the routing system 730 via means of the tendons, 720. The routing system 730 and motor unit, 740 are all contained within the housing system as described above. The routing system 730, is needed to ensure that the tendons 720 are coming off the hand and glove device and onto the forearm portion of the user on an equal plane. This routing system 730 ensures that the orientation of the tendons 720 from how they exit the motor unit 740 to the horizontal plane that they need to be on, is properly routed to the back of the users' hand and fingers. The routing system may be comprised of many individual routing units contained within. The layout of the motors situated within the motor unit 740 influences how many levels of routing systems are needed within the unit. For instance, if the tendons 720 come off of the motors in a vertical orientation relative to each other, each level of the routing system 730 must create a change of degrees until that orientation is vertical. If the motors are laid out so that the tendons 720 come off them in a horizontal orientation to begin with, less levels are needed.

The motors in the motor unit 740 also ensure a constant level of tension in the tendons 720. During operation, whether an interaction is occurring or not, there must always be at least a minimum level of motor activation. With constant tension, each time a virtual interaction does occur, the lowest possible latency can be achieved from virtual interaction to the user feeling the sensation. Furthermore, these motors also allow a pull back on the fingers and thumb based upon some virtual stimuli.

Microcontrollers and software can enable the motors to be controlled to different amplitudes.

Within the housing unit, comprised of the routing system 720 and motor unit 740, are also located cooling fans. The ideal location of the cooling fans is at a position that the flow of air is evenly distributed across all of the motors. This is why more than one cooling fan can be more effective. Depending on the motor layout in the housing system, more than one fan may be needed to best cool all motors.

Power for the haptic system can be via a battery encased within the housing, a battery encased in a waist mounted housing with a cord running to the device on the forearm or a power supply placed externally with an appropriate cord running to the housing on the forearm. In this last instance, the cord must be long enough to enable uninhibited movement about the virtual space. Furthermore, power could be run through the microcontroller if the microcontroller were able to handle the power requirements of the motors.

While the best modes for carrying out the invention have been described in detail, those familiar with the art to which this invention relates will recognize various alternative designs and embodiments for practicing the invention within the scope of the appended claims.

What is claimed is:

1. A glove system comprising:
   a plurality of finger caps configured to circumscribe a corresponding plurality of distal ends of a plurality of fingers of a user when the user is wearing the glove system;
   a plurality of tendon-like cables, wherein each tendon-like cable of the plurality of tendon-like cables is respectively secured to a corresponding finger cap of the plurality of finger caps;
   a housing configured to be worn on a forearm of the user when the user is wearing the glove system;
   a plurality of motors, wherein each motor of the plurality of motors is disposed within the housing and is respectively coupled to a corresponding tendon-like cable of the plurality of tendon-like cables; and
   at least one vibrating motor to be placed within at least one of the finger caps to relay the sensations of shape and structure of an object within the user's hand upon the alignment of the finger caps in the user's palm.

2. The glove system of claim 1, further comprising at least of buckle or strap for securing the housing to the forearm of the user when the user is wearing the glove system.

3. The glove system of claim 1, further comprising a plurality of anchor points located at extremities of the plurality of finger caps.

4. The glove system of claim 3, wherein the plurality of tendon-like cables are attached to the plurality of anchor points located at the extremities of the plurality of finger caps.

5. The glove system of claim 1, further comprising a routing system disposed between the plurality of finger caps and the plurality of motors, wherein the routing system respectively routes the plurality of tendon-like cables from the plurality of finger caps to the plurality of motors.

6. The glove system of claim 5, further comprising a plurality of spools respectively fixed to a plurality of shafts of the plurality of motors, wherein the routing system respectively routes the plurality of tendon-like cables from the plurality of finger caps to the plurality of spools.

7. The glove system of claim 1, wherein a degree of movement of the plurality of tendon-like cables may result in an angular displacement of between 5-10 degrees from a vertical or horizontal plane at any given time.

8. The glove system of claim 7, wherein the angular displacement of the plurality of tendon-like cables allows the user to experience a change in direction.

9. The glove system of claim 1, wherein the anchor points are capable of capturing all the degree of freedom movements of the finger portions.

10. The glove system of claim 1 further comprising at least one tracking device placed disposed on a top of the housing.

11. The glove system of claim 1, further comprising a measuring device coupled to at least one of the plurality of tendon-like cables.

12. The glove system of claim 11, wherein an output of the measuring device is used to determine at least one of a finger position and a pose of the glove system.

13. The glove system of claim 1, wherein the at least one vibrating motor is configured to vibrate independently of at least one other vibrating motor housed within another of the plurality of finger caps.

14. A glove system comprising:
    a plurality of finger caps configured to circumscribe a corresponding plurality of distal ends of a plurality of fingers of a user when the user is wearing the glove system;
    a plurality of tendon-like cables, wherein each tendon-like cable of the plurality of tendon-like cables is respectively secured to a corresponding finger cap of the plurality of finger caps;
    a housing configured to be worn on a forearm of the user when the user is wearing the glove system, wherein the plurality of tendon-like cables are received within the housing;
    a routing system disposed within the housing and configured to route the plurality of tendon-like cables within the housing; and
    at least one vibrating motor to be placed within at least one of the finger caps to relay the sensations of shape and structure of an object within the user's hand upon the alignment of the finger caps in the user's palm.

15. The glove system of claim 14, further comprising:
    a plurality of motors, wherein each motor of the plurality of motors is disposed within the housing and is respectively coupled to a corresponding tendon-like cable of the plurality of tendon-like cables, wherein:
    the routing system is disposed within the housing and disposed between the plurality of finger caps and the plurality of motors; and
    the routing system respectively routes the plurality of tendon-like cables from the plurality of finger caps to the plurality of motors.

16. The glove system of claim 15, further comprising a plurality of spools respectively fixed to a plurality of shafts of the plurality of motors, wherein the routing system respectively routes the plurality of tendon-like cables from the plurality of finger caps to the plurality of spools.

17. The glove system of claim 14, further comprising a plurality of anchor points located at extremities of the plurality of finger caps, wherein the plurality of tendon-like cables are attached to the plurality of anchor points located at the extremities of the plurality of finger caps.

18. An apparatus comprising:
a cable;
a finger cap configured to circumscribe a tip of a finger of a user when the user inserts the finger into the finger cap, the finger cap including an anchor point, wherein the cable is attached to the anchor point of the finger cap and extends from the finger cap;
a housing configured to be worn on a forearm of the user when the user is wearing the apparatus;
a cooling device disposed within the housing; and
a return force provider coupled to the cable and disposed within the housing.

19. The apparatus of claim 18, further comprising a vibrating motor or actuator coupled to the finger cap.

20. The apparatus of claim 18, further comprising a routing fixture, wherein the cable is disposed within and routed to the housing via the routing fixture.

21. The apparatus of claim 18, further comprising:
a second cable;
a second finger cap configured to circumscribe a second tip of a second finger of the user when the user inserts the second finger into the second finger cap, the second finger cap including a second anchor point, wherein the second cable is attached to the second anchor point of the second finger cap and extends from the second finger cap; and
a second return force provider coupled to second cable and disposed within the housing.

22. The apparatus of claim 18, further comprising:
a glove comprising a finger, wherein the finger cap is positioned at an end of the finger of the glove.

23. The apparatus of claim 22, further comprising:
an additional anchor point positioned on the finger; and
a second cable coupled to the additional anchor point.

24. The apparatus of claim 18, further comprising a motor operatively coupled to the cable.

25. The apparatus of claim 18, wherein the return force provider is a motor.

26. The apparatus of claim 18, wherein the cooling device is a cooling fan.

27. The apparatus of claim 26, further comprising a heat sink attached to the return force provider, the cooling device configured to blow air across the heat sink.

* * * * *